United States Patent [19]

Ashton et al.

[11] 4,295,754
[45] Oct. 20, 1981

[54] DISPLAY STRUCTURES AND THE LIKE

[75] Inventors: Christopher J. Ashton, Kimpton; Andrew C. Diamond, Wellwyn Garden City; Derek H. Greenhill, Bromsgrove, all of England

[73] Assignee: Marler Haley Exposystems Limited, England

[21] Appl. No.: 24,943

[22] Filed: Mar. 29, 1979

[30] Foreign Application Priority Data

Apr. 7, 1978 [GB] United Kingdom ............... 13831/78

[51] Int. Cl.$^3$ ................................................ F16B 2/14
[52] U.S. Cl. ................................... 403/369; 403/292; 403/374
[58] Field of Search ................. 40/605, 607, 606, 610, 40/152.1, 152, 156, 10 R, 155; 403/297, 292, 295, 369, 371, 374, 372, 409

[56] References Cited

U.S. PATENT DOCUMENTS

| 2,886,354 | 5/1959 | Bjorklund | 403/372 |
| 3,015,765 | 11/1962 | Repko et al. | 403/371 X |
| 3,058,386 | 10/1962 | Morrow | 403/369 X |
| 3,197,243 | 7/1965 | Brenneke | 403/372 |
| 3,927,467 | 12/1975 | Shoeman | 403/292 X |
| 4,214,793 | 7/1980 | Gargrave | 403/372 X |

FOREIGN PATENT DOCUMENTS

| 191416 | 1/1923 | United Kingdom | 403/292 |
| 510201 | 7/1939 | United Kingdom | . |
| 773819 | 5/1957 | United Kingdom | 403/372 |
| 983320 | 2/1965 | United Kingdom | . |
| 1031787 | 6/1966 | United Kingdom | . |
| 1172256 | 11/1969 | United Kingdom | . |
| 1322514 | 7/1973 | United Kingdom | . |
| 1369236 | 10/1974 | United Kingdom | . |

Primary Examiner—Andrew V. Kundrat
Attorney, Agent, or Firm—Parmelee, Miller, Welsh & Kratz

[57] ABSTRACT

There is disclosed a temporary structure for use in exhibition stands and the like, comprising a framework comprising rectangular frame units each comprising two parallel vertical tubes and two horizontal spars, each in the form of an H with a much elongated cross member and much shortened uprights each of which provides two plugs, respectively above and below the cross member, two said plugs of each said horizontal spar being engaged in respective sockets afforded by the ends of respective ones of the two vertical tubes of the respective frame unit.

In an extended structure each horizontal spar may form the lower spar of one such rectangular frame unit and the upper spar of an adjoining lower frame unit. Spring collets may be fitted around the plugs and within the sockets in which the plugs are inserted the colletts having cutting edges to score the socket walls, and having internal projections fitting in recesses in the plugs whereby a firm non-rotatable connection can be obtained. Connecting pieces adapted to receive two parallel plugs at each end may be employed to achieve horizontal extension of the structure.

5 Claims, 7 Drawing Figures

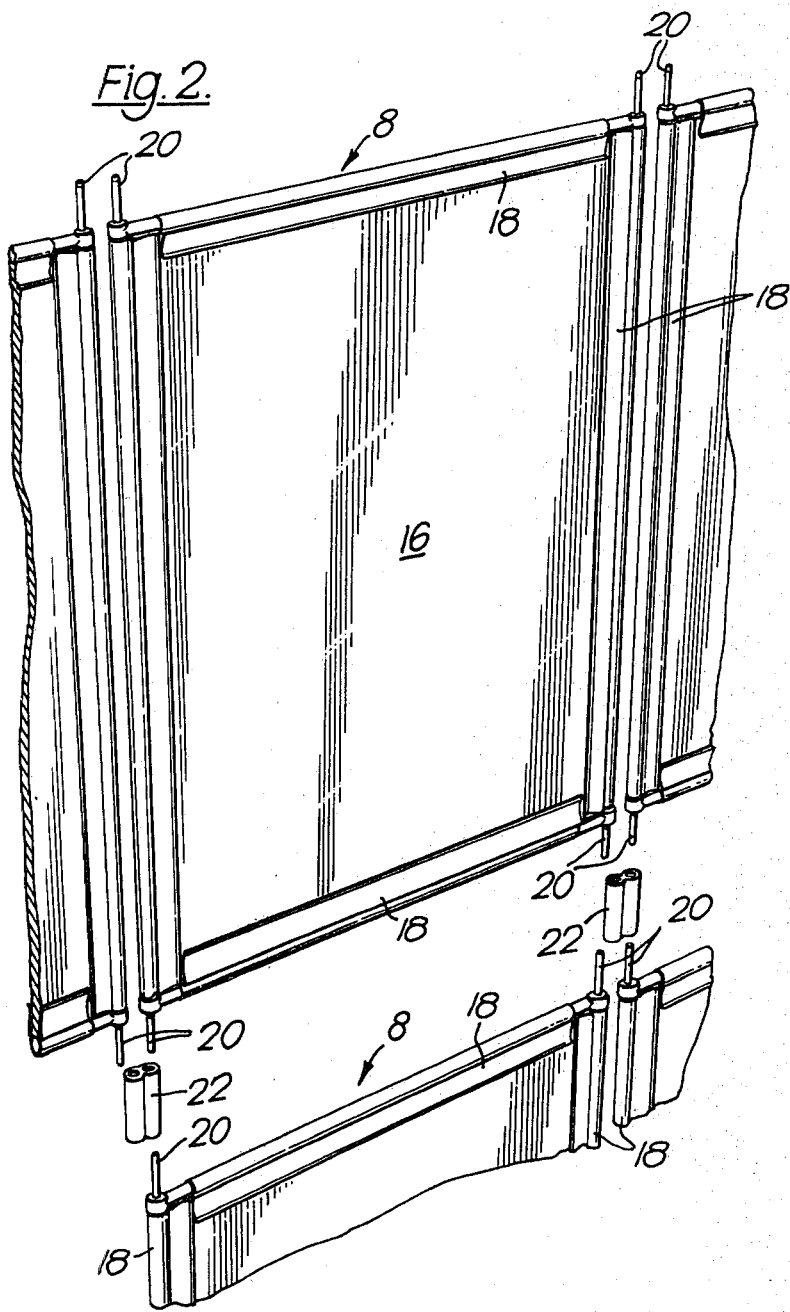

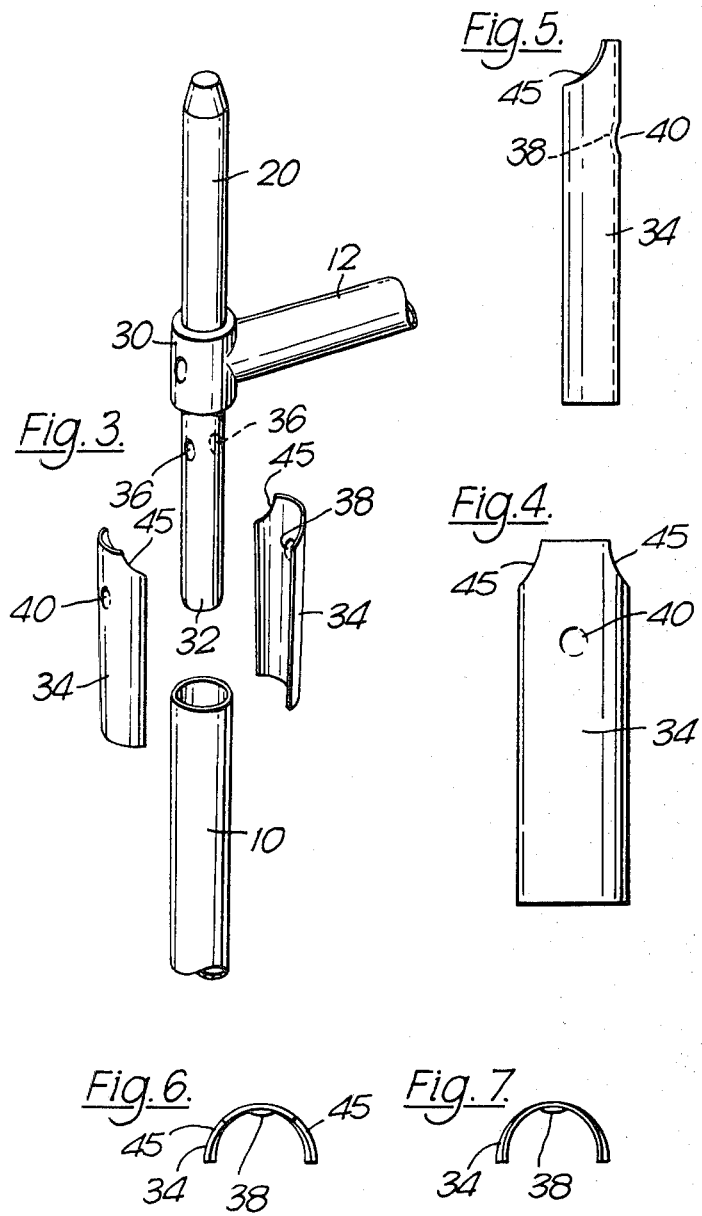

DISPLAY STRUCTURES AND THE LIKE

BACKGROUND OF THE INVENTION

This invention relates to structures and structural frames and is particularly, but not exclusively concerned with temporary, light structures such as may be employed for display purposes at exhibitions or in shops.

Known structures and structural frames for display purposes at exhibitions or in shops have the disadvantages of requiring considerable time, effort and skill to assemble and dismantle and of being expensive, particularly where dismantling involves destruction of the structure so that the latter can be used once only.

SUMMARY OF THE INVENTION

It is among the objects of the invention to provide an improved structure which can be readily assembled to form a rigid structure and can readily be disassembled and which nevertheless can be made inexpensively.

According to one aspect of the invention there is provided a structural frame including an elongate first member and a second elongate member connected at one end with an end of said first member and extending transversely with respect to said first member, said second member being connected with said first member via a plug and socket connection effected by relative movement of the first member and second members in the longitudinal direction of the first member.

According to another aspect of the invention there is provided a structural frame of generally rectangular form including a pair of generally parallel elongate first members spaced apart transversely of each other and connected together via their respective ends by a pair of second elongate members, generally parallel with each other and extending transversely of said first elongate members, said second members being spaced apart in the longitudinal direction of the first-mentioned members, each said second member extending between respective ends of the two first elongate members and being connected with each of said first members via a respective plug and socket connection effected by relative movement of the respective first and second elongate member in the longitudinal direction of said first members.

According to yet another aspect of the invention there is provided a structure including a plurality of interconnected members one of which provides a socket and another of which provides a plug received in said socket to provide a plug and socket connection, at least one wedging member disposed in the socket being resiliently deformed between the periphery of the plug and the opposing socket wall.

The said first members are preferably lengths of hollow cylindrical tubing, thus providing a respective said socket at the end of each said length and the said second members may conveniently also be lengths of tubing each having cylindrical spigots, forming plugs, secured at each end transversely to the length of the tubing so that said second members each have the general form of a flattened 'H'.

In a preferred embodiment, a rectangular structural frame according to the second aspect of the invention mentioned forms a semi-permanently assembled part of a system of parts which can readily be assembled to form a display structure and readily disassembled for packing. The rectangular frame may receive within it a correspondingly dimensioned rectangular panel secured along its edges to the sides of the frame, for example by detachable clips.

In the preferred embodiment the plug and socket of each said plug and socket connection are both cylindrical and each said connection comprises a longitudinally split collet, the two half round parts of which constitute respective resilient wedging members, the collet parts having dimples on their inner sides which engage corresponding depressions in the surface of the socket, and the curvature of the collet parts decreases from the end which, during assembly, enters the socket first, towards the other end, whereby during insertion of the plug, with the collet parts located therearound, into the socket, there is a progressive wedging effect causing progressive resilient deformation of the collet parts and at the same time the relatively sharp outer edges of the lateral margins of the collet parts cut into the softer material of the socket to prevent, in the assembled joint, relative rotational movement between the plug and socket, and whereby warping distortion of a flat rectangular frame comprising such plug and socket joints is minimised.

An embodiment of the invention is described below with reference to the accompanying drawings.

BRIEF DESCRIPTION OF DRAWINGS

In the drawings:

FIG. 2 is a perspective view showing the part of FIG. 1 in an assembled state and also illustrating the manner in which that part can be connected with similar parts via connecting members to form a temporary, extended structure, FIG. 3 is a perspective view to an enlarged scale showing a plug and socket joint incorporated in the part of FIG. 1, FIG. 4 is a front elevation view of a collet part incorporated in the joint of FIG. 3, FIG. 5 is a side elevation view of the collet of FIG. 4, FIG. 6 is a plan view from above of the collet part of FIGS. 4 and 5 and FIG. 7 is a plan view from below of the collet part of FIGS. 4 to 6.

DESCRIPTION OF PREFERRED EMBODIMENT

Figure 1:
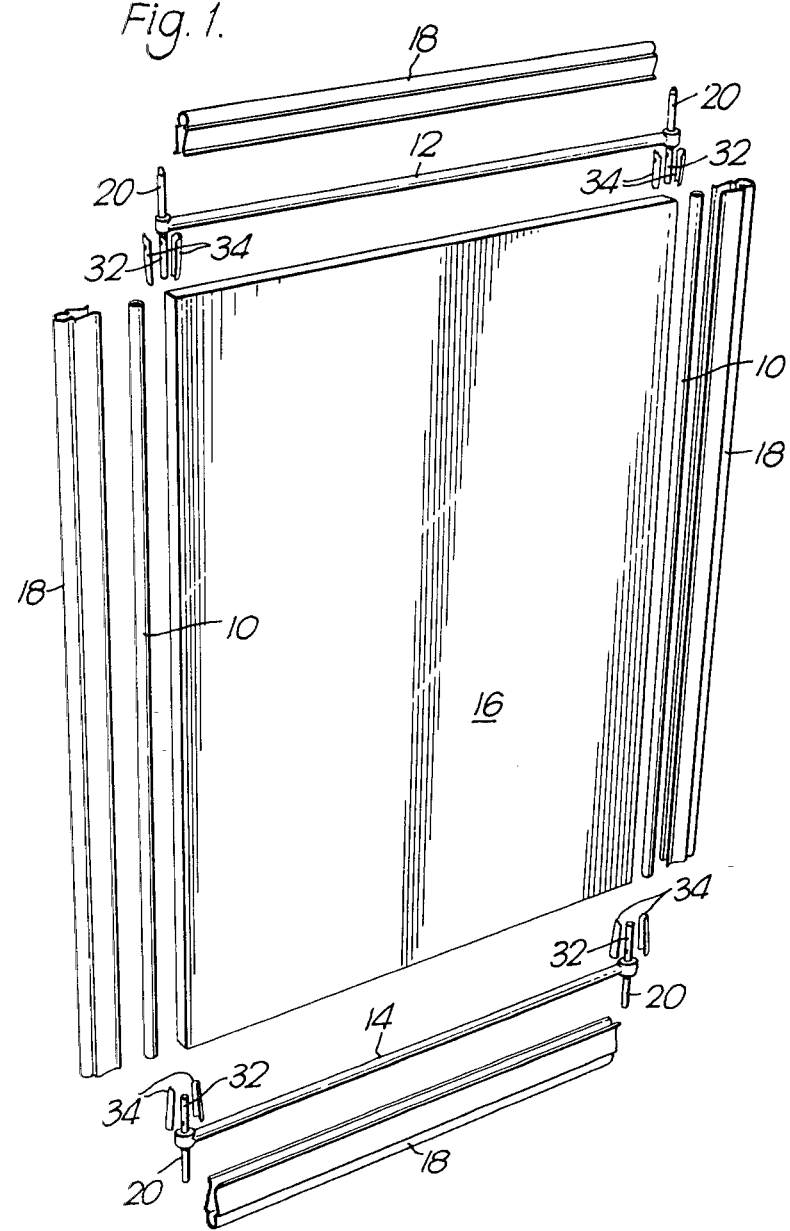
FIG. 1 is an exploded perspective view of part of a modular display system, said part including a structural frame embodying the invention.

Referring to FIG. 1, a generally flat, rectangular unit, constituting a module of a modular, temporary display system, comprises a rectangular frame of metal tubing consisting of two side members 10, a top member 12 and an identical bottom member 14, and a rectangular panel 16 which fits snugly within the rectangular frame and is held in place relative to the side members and top and bottom members by respective resilient clips 18 which are in the form of length of resilient plastics extrusion of constant, generally hairpin-shaped cross section comprising a part circular portion which fits around the respective tubular side or top or bottom member and resilient arms extending from the first-mentioned portion and between which the respective edge portion of the panel 16 is received. The clips 18 are fitted over the respective frame members and the respective edge portions of a panel by pushing the clips over their respective frame member, with the panel 16 located within the frame, in a direction transverse to the longitudinal extent of the respective clip and the associated side member and directed towards the middle of the panel 16.

Referring to FIG. 2, the assembled module 8 provides, at top and bottom, spigots 20 each forming an axial extension of the respective side member 10 of the rectangular frame of the module, and the assembled module 8 can be readily combined with similar modules 8 and with auxiliary connecting elements to form, for example, a display screen for exhibition purposes. Thus, as shown in FIG. 2, the module 8 shown in full may have the spigots 20 at its lower end fitted in respective sockets in respective connecting pieces 22, in the form of identical length of hollow extrusion each providing two parallel laterally spaced sockets to receive respective spigots 20. A module 8 disposed below that shown in full may be connected with the module shown in full by having the spigots 20 at its upper end inserted in the connecting pieces 22 from below, in axial alignment with the respective spigots 20 at the lower ends of the module 8 shown in full. Similarly, adjacent modules 8 can be connected side by side by fitting adjacent spigots 20 of adjoining modules into respective ones of the two sockets of a respective connecting piece 22. Thus a screen comprising a desired number of vertically extending sections connected side by side, and at desired angles with respect to each other viewed in plan, can be formed, each vertically extending section comprising a desired number of modules 8 arranged one above the other, adjoining modules in the screen being interconnected by connecting pieces such as shown at 22. Similarly, connecting pieces such as shown at 22 may be used to connect the adjoining corners of adjoining modules at the top and bottom of the screen, suitable finishing pieces being, for example, inserted in the connecting pieces at the top of the screen and, for example, supporting bases being inserted in the connecting pieces 22 at the bottom of the screen. Arrangements where three or four screen walls meet in a common vertically extending location may also be provided if connecting pieces providing three or four parallel transversely spaced sockets are employed.

Referring once more to FIG. 1, the upper and lower members 12 and 14 of the module frame are identical and each comprises a length of hollow cylindrical tubing, for example of mild steel, having at each end thereof a respective end fitting providing short limbs, in axial alignment with each other extending in opposite directions from each other from opposite sides of the length of tubing providing the major part of the member 12 or 14 and perpendicular to the axis of the latter of tubing. These short limbs at one end of each member 12, 14 are parallel with the corresponding short limbs at the other end of the respective upper or lower member 12, 14 so that each member 12, 14 has the general form of a flattened 'H'. One of the two short limbs provided by each said end fitting constitutes the respective spigot 20.

Referring to FIG. 3, each end fitting comprises a generally cylindrical fin having, intermediate its ends, an enlarged cylindrical boss part 30 which is of substantially the same external diameter as the tubular side members 10 and the tubular major parts of the upper and lower members 12 and 14. Extending from axially opposite ends of the boss part 30 and of reduced diameter with respect to the part 30 are the spigot 20 and the other limb 32 of the end fitting. The spigot 20 is bevelled at its free end to facilitate insertion into the sockets or connecting pieces such as 22. The limb 32 constitutes a plug which, in assembly of the frame of the module, is inserted into the socket afforded by the respective end of the respective side member 10, a collet, having the general form of a tube split axially into two identical parts being interposed between the periphery of the limb 32 and the opposing interior surface of the member 10. The split collet, and two identical parts of which are referenced 34 in FIG. 3, is shown in greater detail and to an enlarged scale in FIGS. 4 to 7.

Each collet part 34 is formed of spring steel sheet material and comprises a strip of such material bent longitudinally into the form of a shallow channel, the circumferential extent of the collet part being substantially constant throughout its length but the curvature increasing progressively from the end shown uppermost in FIGS. 3 to 5 to the ends shown lowermost, so that when the collet parts 34 are fitted to the limb 32, the internal surfaces of the collet part 34 conform closely to the periphery of the limb 32 adjacent the free end thereof, (the lower, free ends of the collet part 34, when fitted to the limb 32, coinciding in position with the position of the lower end of the limb 32), but towards the opposite ends of the collet part 34, and thus towards the part 30, the lateral edges of the collet parts 34 are displaced increasingly outwardly from the peripheral surface of the cylindrical limb 32. Adjacent the part 30, the limb 32 is formed, on diametrically opposite sides thereof, with circular depressions 36, each of which receives, when the collet parts 34 are fitted, a respective protuberance 38 on the respective collet part 34, the protuberances 38 being formed by punching the sheet material of the collet part 34 so that depressions 40 are formed on the convex sides of the collet part 34 corresponding to the protuberances 38 formed on the concave sides.

The external diameter of the limb 32, the internal diameter of the tubular members 10 and the thicknesses of the collet members 34 are so selected that when the collet parts 34 are fitted around the limb 32 with the protuberances 38 engaged in the respective depressions 36, the free end of the assembly comprising the limb 32 and the two collet parts 34 can be fitted snugly within the open end of the respective side member 10 and the last-mentioned assembly can thereafter be driven longitudinally into the member 10 so that each collet part 34 is progressively bent resiliently about the longitudinal axis of the member 10 to decrease its curvature, remote from the free end of member 32, to correspond with its curvature adjacent the free end of member 32. At the same time, the longitudinally extending radially outermost edges of the collet part 34 cut into the softer material of the tube providing the socket, so that in the fully inserted position, in which the respective end face of the part 30 bears upon the end of the respective side member 10, the outer lateral edges of the collet part 34 are resiliently held in engagement with corresponding grooves, cut by these edges, formed in the interior of the side member 10, so that the collet parts 34 are fixedly retained within the end of the respective side member 10 and are retained non-rotatably therein, with the result that the limb 32 and the end fitting as a whole is retained non-rotatably within the respective end of the respective side member 10. It will be observed that at the end of each collet part 34 shown uppermost in FIGS. 3 to 5, the corners of each collet part are cropped along arcuate edges 45, the cropping being so effected as to leave burrs on the convex sides of the collet parts 34 which enhance the resistance to rotation between the collet parts and the member 10.

It will be appreciated that if desired, each collet part 34 may have two or more protuberances 38, the limb 32 having, for each collet part 34, a corresponding number of depressions 36. Similarly, the form of the protuberances and the corresponding depressions on the limb 32 may differ from those shown.

It will be appreciated that in the discussion with reference to FIGS. 3 to 7, it has been assumed that the end fitting is attached to one end of a top member 12. In the case of an end fitting attached to a bottom member 14, the latter would, of course, be arranged with the limb 32 extending upwardly and the spigot 20 downwardly, the collet parts 34 being similarly inverted, assuming, of course, the orientation of the module to be shown in FIGS. 1 and 2.

The invention is naturally not to be considered limited to use of the module in any particular orientation so that, for instance, the module might be used in a horizontal position or any position with its major planes vertical but with the members 10 extending horizontally and the members 12 vertically.

It will be appreciated that the modular system may comprise modules of various different lengths and heights with correspondingly various lengths of top and bottom members 12, 14 and side members 10, and that, in at least some of the modules, rectangular panels within the rectangular frames may be omitted. In such open frames, the non-rotational engagement of the limbs 32 in the sockets provided by the tubes 10 prevents, or minimises, "warping" distortion of the respective rectangular frames.

I claim:

1. A plug and socket connection including a first member defining a socket and a second member defining a plug which is received in said socket, a diametrically split collet being disposed in the socket and being wedged between, and resiliently deformed between, a surface constituted by the periphery of the plug and a surface constituted by an opposing socket wall, at least one of the surfaces between which the collet is disposed being substantially cylindrical, the collet being formed by two similar half-round parts, whereby in the assembled plug and socket connection the collet has a said longitudinal slit in opposite longitudinal sides thereof, each said half-round part of the collet being of greater curvature at one end than at the other so that each said edge of each said slit forms a cutting edge which penetrates said substantially cylindrical surface and is forced into the member providing said surface, thereby preventing relative rotation, about the axis of said substantially cylindrical surface, between, on the one hand, the collet and, on the other hand, the member providing said substantially cylindrical surface, said two parts of the collet being nonrotatably engaged with the other of the members between which the collet is wedged, whereby relative rotational movement of the collet is prevented.

2. A plug and socket connection according to claim 1 wherein said collet is made of spring steel sheet material.

3. A plug and socket connection according to claim 1 wherein said member providing said socket is in the form of a hollow tube providing internally said cylindrical surface penetrated by said longitudinal edges of the collet and wherein said plug is also cylindrical but has recesses thereon to accommodate corresponding internal projections on said half-round parts of said collet to prevent rotation of the collet with respect to the plug about the axis of the latter.

4. A plug and socket connection according to claim 3 wherein the circumferential extent of each of said two parts of the collet is substantially constant over the major part of the length thereof, but the curvature of each of said parts increases progressively from one end thereof to the other, the internal surface of each of said parts, at its more highly curved end, conforming closely with the external surface of said plug.

5. A plug and socket connection according to claim 4 wherein each of said parts of said collet, at the less highly curved end thereof, has its corners cropped along respective arcuate edges, the cropping of said corners being so effected as to leave burrs on the convex sides of the collet parts which enhance the resistance to rotation between the collet parts and the socket.

* * * * *